W. W. SYFERT.
COUPON BOOK.
APPLICATION FILED OCT. 12, 1912.

1,086,569.

Patented Feb. 10, 1914.

UNITED STATES PATENT OFFICE.

WILLIAM W. SYFERT, OF TULSA, OKLAHOMA.

COUPON-BOOK.

1,086,569. Specification of Letters Patent. Patented Feb. 10, 1914.

Application filed October 12, 1912. Serial No. 725,460.

*To all whom it may concern:*

Be it known that I, WILLIAM W. SYFERT, citizen of the United States, residing at Tulsa, in the county of Tulsa and State of Oklahoma, have invented certain new and useful Improvements in Coupon-Books, of which the following is a specification.

This invention relates to certain novel and useful improvements in coupon books.

In carrying out my invention, it is my purpose to provide a coupon book which may be employed by merchants and other business men in connection with the sale and delivery of the particular merchandise in which they deal.

Still a further object of my invention is the provision of a book containing series of similar coupons each redeemable in a predetermined quantity of a particular merchandise. This book contains in addition to the block of coupons, a sheet or page, which for the sake of convenience may be termed a "payment slip" and indicates, when properly signed by the customer the terms of payment on which the book was sold to him, that is, whether such customer has paid cash for the coupons or has obtained the same on a credit basis. The book is further provided with a second sheet or page, preferably constituting a portion of the cover of the book, which latter page also possesses a predetermined value, such as the equivalent of one coupon, and is to be surrendered for redemption after all the coupons in the book have been used. The particular use and advantages of this payment slip and redemption card will be hereinafter set forth in detail.

Still a further object of the invention is the provision of a coupon book by means of which the time, labor and expense usually incident to the accounting system of a mercantile house employing coupons in its business may be greatly reduced.

In the present instance, I have shown my invention as embodied in a coupon book designed especially for use by merchants or dealers engaged in the sale of ice, but I wish it to be understood that the invention is not limited in its useful application to this particular purpose which is herein shown and described merely by way of illustration, as such invention may be employed in any connection where its use may be deemed desirable and advantageous.

The invention consists in the improved coupon book and in the construction, combination and arrangement of the parts thereof set forth in and falling within the scope of the appended claim.

In the accompanying drawings:—Figure 1 is a plan view showing the coupon book in open position and exposing the inside face of the front cover and the face of the "payment slip." Fig. 2 is a similar view showing the inside face of the back cover which also forms the redemption card, one of the coupon sheets of the book being partially turned to show the coupon.

Referring now to the accompanying drawings in detail, the letter A designates the front cover of the coupon book, while B indicates the rear cover thereof, the block or package of coupons being shown at C. These coupons are of usual form and need not be described here in detail. The inside face of the front cover A may be printed or stamped with an ordinary form of receipt as shown at 1.

Facing the receipt on the front cover is the page or sheet which I have termed the "payment slip," and which forms an important feature of the present invention. This payment slip which is indicated by the letter D is detachably connected to the coupon book by the line of perforations or scoring 2, and is provided preferably near the upper central portion with a block 3 printed or stamped thereon, which block contains the number of the coupon book as shown at 4, such number in the present instance being 199. It will of course be understood that each individual coupon belonging to this book bears a corresponding number. This sheet or slip is divided by the vertical line 5 into the sections 6 and 7. The section 6 in the present instance forms the credit section and is so indicated, while the section or side 7 forms the cash section, as shown. The credit side is to be used for the customer's signature and address when the coupon book is purchased on credit, while the cash side is employed when cash is paid for the book. The ship D is to be detached from the book when the latter is sold by the agent, and such slip should be filled out by the purchaser to obviate difficulty which might subsequently arise as to signature.

The credit section of the slip, as shown in Fig. 1, contains printed matter 8 which indicates the location, date of sale, agent delivering the book, the firm selling the goods indicated, the amount to be charged to the purchaser, the time when the account is to be paid and the signature and address of the purchaser. The cash section of the slip when properly filled out sets forth the location, date of sale, agent delivering the book, name of the selling firm, the amount paid by the customer and the name and address of the latter as indicated by the printed matter shown at 9. This printed form on the cash side shows that the customer has paid for the merchandise to be received and places the performance of the contract on the company. This payment slip is to be detached by the agent when the same is signed by the customer and the book delivered to the latter, the slip being returned to the merchant for filing and future reference.

It will of course be understood that the receipt shown at 1 upon the front inside cover is filled out and signed by the issuing party only after the book has been paid for. This may be at the time of sale, if the transaction is a cash one, or subsequently, if the book is sold on a credit basis. The use of this payment slip is exceedingly advantageous inasmuch as it obviates the liability of disputes between the selling concern and the customer as to the payment for the coupon book. Many concerns employing coupon books in the transaction of their business have experienced difficulty in having agents deliver books with the receipt signed by the purchaser which does not specify whether the latter paid cash or obtained the book on credit. The purchasers frequently claim they paid the agent for the book at the time the latter was delivered, while the agent asserts that the book was obtained on credit. Thus, owing to the inefficiency of the system or the lack of a proper record, the merchant is exceedingly liable to suffer loss through failure to obtain proper payment for the book, or through the defection of the customer. By the use of this payment slip, however, a check is placed on both the customer and the agent, for if the former pays cash for the book, he will take care to see that he signs the slip at the proper section to avoid having his account charged with the cost of such book, while the agent, if he delivers the book on credit, will take care to have the customer properly sign the slip inasmuch as such agents are charged with the books in the usual way, and when settling their accounts at the end of the day must turn in either the payment slips or the books Referring to Fig. 2 of the drawing, it will be seen upon the inner face of the back cover is printed a coupon 10, which is preferably of the smallest denomination used in the book, while printed matter 11 explanatory of the use of the same also appears. The coupon and the printed instructions form and combine a redemption or closing up card and must not be detached from each other. The entire card, however, is to be detached from the book by tearing at the scored or perforated line 12. This redemption card is not to be used until all the coupons in the book have been detached. The redemption card when received at the merchant's office is taken as payment for the amount indicated on the face of the coupon 10. When this card is received at the office, it marks the closing of the coupon book bearing the specified number, in the present instance, 199. The date of receiving the redemption card must be stamped or written in the space 13, and after necessary bookkeeping has been completed, should be filed numerically, thus constituting a permanent and accurate record of the closing of the book. After the receipt of this card by the merchant no more coupons bearing this number should be received in payment for goods. The advantages incident to the use of this redemption card which forms as recited, a part of the book cover itself are manifold. For instance, it furnishes an easy method of the merchant supplying the customer with a new book through the agent or solicitor; it prevents accounts being continued to persons whose credit does not warrant it; it is a sure reminder to quickly present a bill when it is desired to make collection as soon as a book is used.

By the use of my invention, the amount of clerk hire necessary to be employed is materially reduced, and at the same time, the number of disputes, errors, and losses is very much lessened.

What I claim is;—

A coupon book comprising front and back covers, a series of similar coupons, and a payment sheet, all of said parts bearing the same identifying number, said coupons and sheet being provided with weakened lines whereby each is readily detachable from said book, the inside front cover having a receipt form printed thereon, and said payment sheet being provided with a line dividing the same into two sections, one of said sections having thereon printed matter indicative of a credit transaction and the other of said sections having thereon printed matter indicative of a cash transaction, each of said sections also having a space for the name and address of the purchaser, whereby either the credit or cash section may be filled out and signed in accordance with the nature of the transaction, and the sheet detached by the issuing party, the said receipt being signed by said party only when the book is paid for, the back cover of the book being provided with a weakened line whereby it is itself detachable, and the last of the series of coupons being printed directly thereon, said cover carried coupon having characteristics distinguishing it from the other coupons, whereby said coupon, when presented to the issuing party, serves to indicate to said party that the book is exhausted.

In testimony whereof I affix my signature in presence of two witnesses.

WILLIAM W. SYFERT.

Witnesses:
A. M. HASSLER,
USHER CARSON.